United States Patent
Song et al.

(10) Patent No.: US 10,621,728 B2
(45) Date of Patent: Apr. 14, 2020

(54) INTERNAL ORGAN LOCALIZATION IN COMPUTED TOMOGRAPHY (CT) IMAGES

(71) Applicant: SONY CORPORATION, Tokyo (JP)

(72) Inventors: Bi Song, San Jose, CA (US); Ko-Kai Albert Huang, San Jose, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 16/018,303

(22) Filed: Jun. 26, 2018

(65) Prior Publication Data
US 2019/0392584 A1 Dec. 26, 2019

(51) Int. Cl.
*G06T 7/11* (2017.01)
*G06T 7/00* (2017.01)
(Continued)

(52) U.S. Cl.
CPC ............ *G06T 7/11* (2017.01); *G06T 7/0012* (2013.01); *G06T 15/08* (2013.01); *G06T 17/10* (2013.01);
(Continued)

(58) Field of Classification Search
CPC ......... G06T 7/11; G06T 7/0012; G06T 15/08; G06T 17/10
See application file for complete search history.

(56) References Cited

U.S. PATENT DOCUMENTS

| 7,545,979 B2 | 6/2009 | Fidrich et al. |
| 8,229,188 B2 | 7/2012 | Rusko et al. |

(Continued)

FOREIGN PATENT DOCUMENTS

| EP | 3213296 A1 | 9/2017 |
| GB | 2547399 A | 8/2017 |

(Continued)

OTHER PUBLICATIONS

Karami, et al."Fully Automatic Algorithm for Segmenting Full Human Diaphragm in non-contrast CT Images", Medical Imaging 2015: Biomedical Applications in Molecular, Structural, and Functional Imaging, Proceedings of SPIE vol. 9417, Mar. 2015, 06 pages.

(Continued)

*Primary Examiner* — David Bilodeau
(74) *Attorney, Agent, or Firm* — Chip Law Group

(57) ABSTRACT

An assistive apparatus for organ localization, includes storing a 3D representation and CT images of an anatomical portion of the body of a subject. A localization circuitry determines a rib region and a spine region in the CT images and calculates first and second number of voxels within a first and second region of the 3D representation, respectively. The localization circuitry determines the right side of the body in the CT images, based on a comparison result for the first and second number of voxels. The localization circuitry detects a first bottom portion of right lung based on a distribution of intensity values of pixels in a region of right lung. The localization circuitry detects a second bottom portion of the rib region and localizes the liver organ in the CT images, from a reference of the detected first bottom portion and the detected second bottom portion.

20 Claims, 9 Drawing Sheets

(51) Int. Cl.
*G06T 15/08* (2011.01)
*G06T 17/10* (2006.01)

(52) U.S. Cl.
CPC .............. *G06T 2207/10081* (2013.01); *G06T 2207/30012* (2013.01); *G06T 2207/30056* (2013.01); *G06T 2207/30061* (2013.01)

(56) References Cited

U.S. PATENT DOCUMENTS

| 8,447,085 B2 | 5/2013 | Gloger | |
|---|---|---|---|
| 10,299,864 B1* | 5/2019 | Yu | A61B 34/20 |
| 2003/0099384 A1* | 5/2003 | Zeng | G06T 7/0012 |
| | | | 382/128 |
| 2003/0099389 A1* | 5/2003 | Zeng | G06T 7/0012 |
| | | | 382/131 |
| 2007/0276214 A1* | 11/2007 | Dachille | G06T 7/0012 |
| | | | 600/407 |
| 2016/0292847 A1* | 10/2016 | Liu | G06T 19/20 |
| 2017/0000567 A1* | 1/2017 | Kim | A61B 10/0233 |
| 2017/0249744 A1 | 8/2017 | Wang et al. | |
| 2018/0025512 A1* | 1/2018 | Zhu | G06T 11/008 |
| | | | 382/131 |
| 2018/0286050 A1* | 10/2018 | Cheng | G06T 7/143 |
| 2019/0164291 A1 | 5/2019 | Wang | |

FOREIGN PATENT DOCUMENTS

| GB | 2559013 A | 7/2018 |
|---|---|---|
| WO | 2016/086744 A1 | 6/2016 |

OTHER PUBLICATIONS

Li, et al., "Automatic liver contouring for radiotherapy treatment planning", Institute of Physics and Engineering in Medicine, vol. 60, No. 19, Sep. 9, 2015, 24 pages.

International Search Report and Written Opinion of PCT Application No. PCT/IB2019/054884, dated Sep. 27, 2019, 13 pages of ISRWO.

Goryawala, et al., "A Low-Interaction Automatic 3D Liver Segmentation Method Using Computed Tomography for Selective Internal Radiation Therapy", PMCID: PMC4106113, Jul. 3, 2014, 16 pages.

Campadelli, et al., "Automatic Abdominal Organ Segmentation from CT images", Electronic Letters on Computer Vision and Image Analysis, vol. 8, Issue 1, 2009, 14 pages.

* cited by examiner

INTERNAL ORGAN LOCALIZATION IN COMPUTED TOMOGRAPHY (CT) IMAGES

CROSS-REFERENCE TO RELATED APPLICATIONS/INCORPORATION BY REFERENCE

None.

FIELD

Various embodiments of the disclosure relate to organ localization and computer-assisted diagnosis technologies. More specifically, various embodiments of the disclosure relate to an apparatus and method for internal organ localization in Computed Tomography (CT) images.

BACKGROUND

Advancements in the field of medical imaging techniques and associated sensors and/or devices have made it possible to localize the internal organs of a human or animal body, for clinical analysis and medical purposes. In conventional systems, different medical imaging modalities, such as a Computed Tomography (CT) image, a Magnetic Resonance Imaging (MRI), an X-ray and the like, are used in internal organ localization. Typically, physicians and radiologists may have to manually delineate an internal organ region slice by slice from the CT image that may be tedious and undesirable.

In certain scenarios, an atlas-based method is used to localize and segment the internal organ, for example, a liver from the CT image. An atlas image is a specific model generated from a large dataset of a plurality of CT images. The physicians and radiologists delineate a region of interest of an internal organ of interest by segmenting the internal organ of interest slice by slice from each of the plurality of CT images to generate the atlas image. The generated atlas image is further utilized to localize and segment the internal organ of interest in CT images of a given user. The localization of the internal organ of interest from the atlas-based method may be inaccurate and the percentage of error for each patient may be different as the spatial position, size, shape and appearance of the internal organ of interest may be different for each user. In certain scenarios, the spatial position, size, shape and appearance of the internal organ of the patient may look different when observed by a surgical camera, such as a laparoscope, from normal due to an infection or a disease. Thus, the localization of the internal organ of based on the atlas image may be inaccurate. Furthermore, generation of the atlas image from the large dataset by the radiologists may be tedious and undesirable.

In certain other scenarios, a classification-based method may be utilized to localize the internal organ from the CT image. The classification-based method uses training data to extract a set of image features, such as region mean intensity, variance, location, histogram and contextual features, to train a classifier by which probability map for the internal organ is generated. The internal organ of interest is localized based on the generated probability map which may not be accurate as the extracted set of image features may be different for different users.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An assistive apparatus and a method are provided for internal organ localization in Computed Tomography (CT) images, as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for internal localization in Computed Tomography (CT) images. Exemplary aspects of the disclosure provide an assistive apparatus that includes a memory configured to store a three dimensional (3D) representation of an anatomical portion of a body of a subject and a CT images. The assistive apparatus further includes a localization circuitry configured to localize a liver organ in the CT images. In contrast to conventional systems, the disclosed assistive apparatus utilizes anatomical structure information of a body of a subject, such as a human body, to automatically localize an internal organ, such as a liver organ, of the body of the subject in the CT images. The assistive apparatus locates the liver organ in a bounding box from the CT images of the body of the subject based on association of the liver organ with other internal organs and bone structures of the body of the subject. The liver organ is accurately and precisely segmented, based on the localization of the liver organ which is useful for precise computer-assisted diagnosis and therapy. The localization of the liver organ is patient specific, which is based on the set CT images of an individual patient. Therefore, the segmentation of the liver organ based on the localization of the liver organ is further utilized in patient specific liver anatomy evaluation, functional assessment and treatment planning. For example, the assistive apparatus may be used for locating and accessing a tumor in the localized liver organ of the body in the CT images in pre-operative state. In some cases, the assistive apparatus may be used for locating liver organ during intra-operative stage. The disclosed assistive apparatus enables automatic and accurate localization of the liver organ for different patients.

Figure 1:
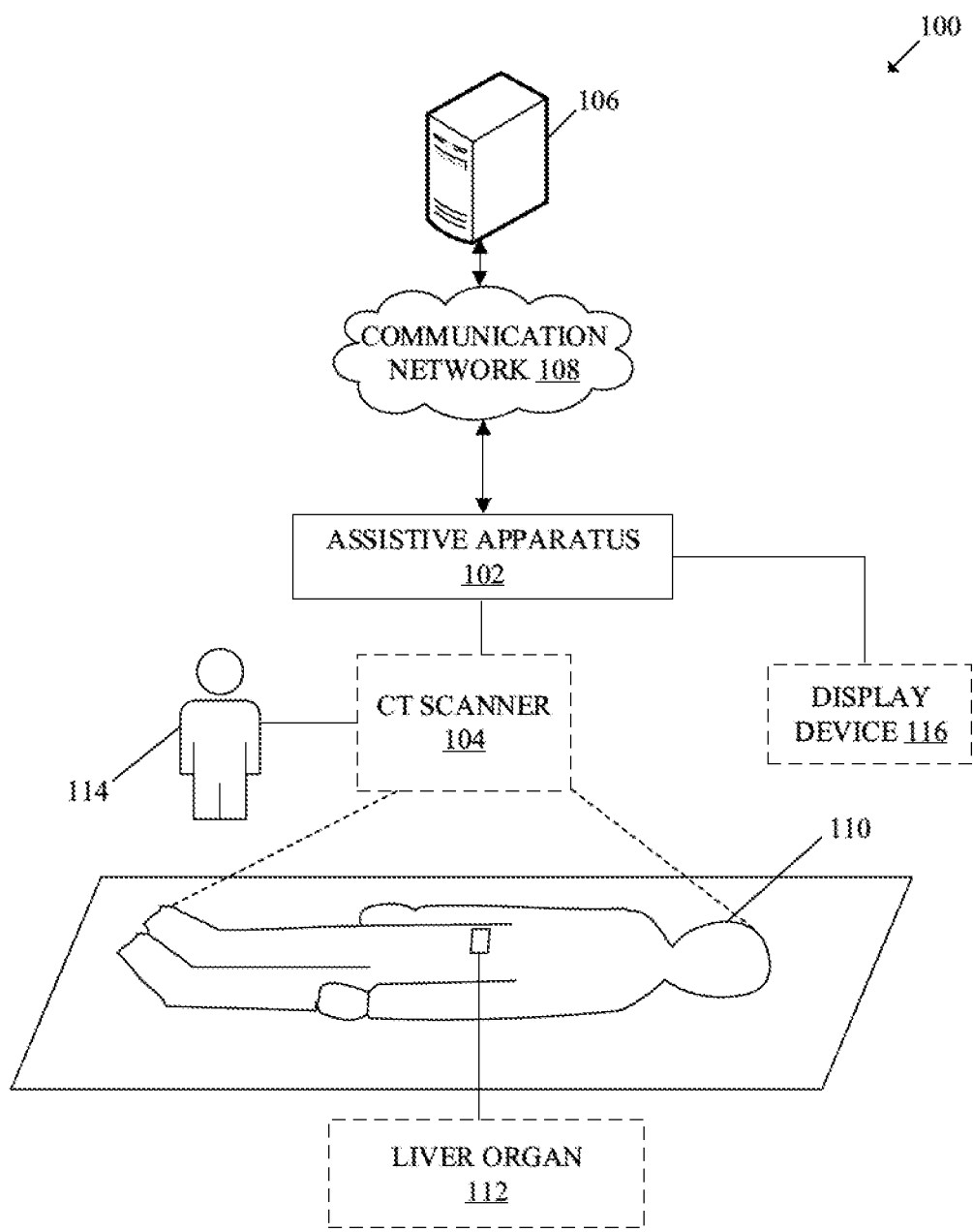
FIG. 1 is a diagram that illustrates a network environment for internal organ localization in Computed Tomography (CT) images, in accordance with an embodiment of the disclosure.

FIG. 1 is a diagram that illustrates a network environment for internal organ localization in Computed Tomography (CT) images, in accordance with an embodiment of the disclosure. With reference to FIG.1, there is shown a network environment 100. The network environment 100 may include an assistive apparatus 102, a CT scanner 104, a server 106, and a communication network 108. There is shown one or more users, such as a human subject 110, and a healthcare provider 114 and a liver organ 112. The assistive apparatus 102 may be communicatively coupled to the server 106, via the communication network 108. The assistive apparatus 102 may be communicatively coupled to the CT scanner 104. In some embodiments, a display device 116 may be integrated with the assistive apparatus 102. In some embodiments, the display device 116 may not be integrated with the assistive apparatus 102, and may be an external device that is communicatively coupled to the assistive apparatus 102.

The assistive apparatus 102 may comprise suitable logic, circuitry, and interfaces that may be configured to localize an internal organ, such as the liver organ 112, of the human subject 110 for use in computer-assisted diagnosis, therapy, and/or surgery. The assistive apparatus 102 may be configured to localize the liver organ 112 of the human subject 110 from CT images received from the CT scanner 104. The localized liver organ may be utilized by the healthcare provider 114 for liver anatomy evaluation of the human subject 110. Examples of the assistive apparatus 102 may include, but are not limited to, an organ localization device, a computer-assisted diagnosis system or a robot-assisted diagnosis and surgery system, a medical device, an electronic localization instrument, a display device, or a computing device. FIG. 1 is described in reference to a localization of the liver organ 112 in an example. However, the localization technology of the assistive apparatus 102 for internal organ localization may be employed for localize any other abdominal organ, such as stomach, pancreas, and the like, without limiting the scope of the disclosure based on anatomical structure information of a human body and the CT images.

The CT scanner 104 may comprise suitable logic, circuitry, and interfaces that may be configured to capture the cross-sectional CT images of the human subject 110. In some embodiments, the CT images may be referred to as a CT scan of the human subject 110. In some embodiments, the CT scanner 104 may be a CT scanner. The captured CT images may be based on Digital Imaging and Communications in Medicine (DICOM) standard medical images.

The server 106 may comprise suitable circuitry, and interfaces that may be configured to store the CT images of the human subject 110 captured by the CT scanner 104. The server 106 may store the anatomical structure information of the internal organs of a human body. The server 106 may be further configured to store three dimensional (3D) representation of an anatomical portion of the body of the human subject 110. In accordance with an embodiment, the server 106 may be configured to communicate the stored anatomical structure information of the internal organs of a human body to the assistive apparatus 102, via the communication network 108. In some embodiments, the server 106 may be implemented as a cloud server, which may be utilized to execute the aforementioned operations of the server 106 through web applications, cloud applications, HTTP requests, database operations, file transfer, and the like. It is to be understood by one of the ordinary skill in the art that the scope of the disclosure is not limited to implementation of the server 106 and the assistive apparatus 102 as separate entities. In accordance with an embodiment, the functionalities of the server 106 may be implemented by the assistive apparatus 102, without departure from the scope of the disclosure.

The communication network 108 may include a communication medium through which the assistive apparatus 102 may be communicatively coupled to the server 106 and the CT scanner 104. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

The display device 116 may comprise suitable logic, circuitry, and interfaces that may be configured to display the CT images captured by the CT scanner 104. The display device 116 may be further configured to display a liver bounding box that includes the liver organ 112 of the human subject 110. Examples of the display device 116 may include, but are not limited to, a display screen, an integrated display of a medical apparatus, such as the assistive apparatus 102, or other special-purpose display devices suited for medical purposes.

In operation, the CT scanner 104 may be configured to capture CT images of the body of the human subject 110. The CT images may comprise different representations of a plurality of internal organs and associated anatomical regions of the body of the human subject 110. The CT images are cross-sectional images that are produced using X-rays and shows interior of a body, for example, the body of the human subject 110. The CT images includes representation of both hard (e.g., bone including rib cage) and soft tissues (e.g. liver or other abdominal organs). The CT images may be used to generate 3D volumetric data that may be visualized via a set of views that may comprise at least an axial view, a coronal view, and a sagittal view of the body or a portion of the body of the human subject 110. The axial view may be obtained with respect to at least one of a top and a bottom of the body of the human subject 110. The coronal view may be obtained with respect to at least one of an anterior and a posterior of the body of the human subject 110. Similarly, the sagittal view may be obtained with respect to at least one of a left and a right of the body of the human subject 110, where the left and the right of the body is considered with respect to the viewpoint of the human subject 110. The assistive apparatus 102 may be configured to store a three-dimensional (3D) representation of an anatomical portion of the body of the human subject 110. The stored 3D representation may comprise different representations of the plurality of internal organs and associated anatomical regions of the body of the human subject 110. The 3D representation of the anatomical portion of the body of the human subject 110 may include 3D volumetric data that may comprise a plurality of voxels. The plurality of voxels of the 3D volumetric data may be distributed in accordance with the plurality of internal organs and associated anatomical regions in the anatomical portion of the body of the human subject 110 in a 3D space. The 3D volumetric data of the body or the portion of the body of the human subject 110 may be generated from a plurality of radiographic images captured around a single axis of rotation. The 3D volumetric data may be obtained from a group of 2D slice images acquired by CT scan by the CT scanner 104, based on digital geometry processing. The CT scanner 104 may be configured to communicate the captured CT images of the body or the portion of the body of the human subject 110 to the assistive apparatus 102.

In accordance with an embodiment, the assistive apparatus 102 may be configured to segment different regions that correspond to different internal organs or structures present in CT images. For the segmentation of the different regions that correspond to different internal organs or structures present in CT images, a defined sequence of segmentation or organ identification of the different regions that correspond to different internal organs or structures may be followed. For example, the defined sequence of segmentation may start with lungs segmentation followed by skeletal region (e.g. spine and ribs region) identification to enhance accuracy of a specific internal organ localization, such as liver localization.

The assistive apparatus 102 may be configured to apply a first thresholding operation to the CT images. The first thresholding operation may be applied based on a first threshold intensity value. The first thresholding operation may be an image segmentation method that may be utilized to segment a pair of lung regions from the CT images. The assistive apparatus 102 may be configured to segment the pair of lung regions from a first thresholded CT images based on the anatomical structure information of the human body. The body region of the human subject in the first thresholded CT images may exhibit an intensity value that is greater than the first threshold intensity value. The pair of lung regions in the first thresholded CT images may exhibit an intensity value that is less than the first threshold intensity value and are located inside human body. The segmented pair of lung regions may be a large and connected dark region in the first thresholded CT images which may comprise a left lung and a right lung of the body of the human subject 110. Thereafter, the assistive apparatus 102 may be further configured to detect a skeletal region of the body of the human subject 110 in the CT images by application of a second thresholding operation on the CT images. The second thresholding operation for the detection of the skeletal region of the body of the human subject 110 may be based on a second threshold intensity value. The skeletal region in the second thresholded CT images may exhibit an intensity value that is greater than the second threshold intensity value. The detected skeletal region of the body of the human subject 110 may comprise a rib region, a spine region, and other body portions different from the rib region and the spine region of the body of the human subject 110.

In accordance with an embodiment, the assistive apparatus 102 may be further configured to apply a mask on the other body portions different from the rib region and the spine region of the body on the CT images. The other body portions may be body portions that are different from the rib region and the spine region of the body on the CT images. The mask may be applied using a bounding region on the CT images. The mask may be applied on the CT images such that a center of the mask coincides with a center of the bounding region that covers a maximum area of the detected skeletal region in the CT images. The applied mask may cover the other body portions different from the rib region and the spine region of the body of the human subject 110. The assistive apparatus 102 may be configured to remove the masked other body portions different from the rib region and the spine region of the body of the human subject 110 from the CT images. The assistive apparatus 102 may be configured to determine the rib region and the spine region of the body of the human subject 110 from the CT images based on the removal of the masked other body portions different from the rib region and the spine region of the body of the human subject 110.

In accordance with an embodiment, the assistive apparatus 102 may be configured to position a pair of centroids for the pair of lung regions in the CT images. The pair of centroids may be positioned such that one centroid may be marked for the right lung and another centroid may be marked for the left lung in the CT images. The assistive apparatus 102 may be further configured to identify a plane formed by the centroid of the right lung and the centroid of the left lung. The assistive apparatus 102 may be configured to separate a portion of the 3D representation (e.g., a volumetric data of the human subject 110 from neck to waist portion) of the anatomical portion of the body of the human subject 110 to a first region and a second region based on the identified plane. The separated first region and the second region of the portion of the 3D representation may also bifurcate the CT images into two halves based on the identified plane. Alternatively stated, the first region of the portion of the 3D representation may correspond to a first half of the bifurcated two halves of the CT images and the second region of the portion of the 3D representation may correspond to a second half of the bifurcated two halves of the CT images.

The assistive apparatus 102 may be configured to calculate a first number of voxels from only the determined rib region and the spine region (e.g., bone voxels) present in the first region of the 3D representation. The assistive apparatus 102 may be further configured to calculate a second number of voxels (e.g., bone voxels) from only the determined rib region and the spine region present in the second region of the 3D representation. The assistive apparatus 102 may be configured to generate a comparison result for the first number of voxels within the first region and the second number of voxels within the second region of the portion of the 3D representation. The comparison result may be generated based on a comparison between the first number of voxels in the first region and the second number of voxels in the second region of the portion of the 3D representation from only the determined rib region and the spine region. The generated comparison result may be further utilized to determine an anterior side and a posterior side of the body of the human subject 110. The comparison result may indicate a comparison between the first region and the second region based on the first number of voxels and the second number of voxels from only the determined rib region and the spine region.

The assistive apparatus 102 may be configured to identify the anterior side and the posterior side of the body of the human subject 110 based on the generated comparison result. According to the stored anatomical structure information of the human body, the number of voxels from the rib region and the spine region in the anterior side of the body of the human subject 110 may be less than the number of voxels from the rib region and the spine region in the posterior side of the body of the human subject 110. Therefore, the assistive apparatus 102 may be configured to identify the first region as the anterior side and the second region as the posterior side of the human subject 110 when the number of voxels from the rib region and the spine region in the first region may be less than the number of voxels from the rib region and the spine region in the second region of the portion of the 3D representation. In accordance with an embodiment, the assistive apparatus 102 may be configured to identify the second region as the anterior side and the first region as the posterior side of the human subject 110. In such a scenario, the number of voxels from the rib region and the spine region in the second region may be less than the number of voxels from the rib region and the spine region in the first region of the portion of the 3D representation.

In accordance with an embodiment, the assistive apparatus 102 may be configured to identify the first half of the bifurcated two halves of the CT images as the anterior side and the second half of the bifurcated two halves as the posterior side of the human subject 110, based on the generated comparison result. The assistive apparatus 102 may identify the first half of the bifurcated two halves of the CT images, as the anterior side of the human subject 110, when in the generated comparison result, the first number of voxels in the first region of the portion of the 3D representation may be less than the second number of voxels in the second region of the portion of the 3D representation. In accordance with an embodiment, the assistive apparatus 102 may be configured to identify the second half of the bifurcated two halves of the CT images as the anterior side of the human subject, when in the generated comparison result, the second number of voxels in the second region of the portion of the 3D representation may be less than the first number of voxels in the first region of the portion of the 3D representation.

The assistive apparatus 102 may be further configured to determine a right side of the body of the human subject 110 based on the determined anterior side and a posterior side as well as the superior side and interior side of the body of the human subject 110 in the CT images. The right side of the body of the human subject 110 may comprise the right lung of the body of the human subject 110 in the CT images.

In accordance with an embodiment, the assistive apparatus 102 may be further configured to compute a minimal position values on a surface of the right lung located in the right side of the body. The minimal position values on the surface of the right lung may be computed with respect to a position of a plurality of pixels in the right lung along a specific axis. The specific axis may correspond to a "Z" axis of a 3D coordinate space.

In accordance with an embodiment, the assistive apparatus 102 may be configured to compute a plurality of gradient vectors associated with the plurality of pixels a first bottom region of the right lung of the body of the human subject 110. The plurality of gradient vectors may comprise a first set of gradient vectors and a second set of gradient vectors. The first bottom region may not be an accurate bottom surface of the right lung, which may comprise of some other portions of the right lung, such as side wall of the right lung. The assistive apparatus 102 may be configured to remove a set of pixels associated with the second set of gradient vectors from the first bottom region of the right lung. The assistive apparatus 102 may further detect a first bottom portion of the right lung based on removal of the determined set of pixels from the first bottom region of the region of the right lung. The detected first bottom portion of the right lung may be the accurate bottom surface of the right lung of the human subject 110.

The assistive apparatus 102 may be further configured to detect a second bottom portion of the rib region from the determined rib region based on a known shape of the rib region. The known shape of the rib region may be identified based on the stored anatomical structure information of the human body. The assistive apparatus 102 may be configured to extract a liver bounding box that includes the liver organ 112 of the body of the human subject 110. The liver bounding box may be extracted based on the detection of the first bottom portion of the right lung and the second bottom portion of the determined rib region in the CT images. The assistive apparatus 102 may be configured to determine an area and positioning of the liver bounding box on the CT images. The area and positioning of the liver bounding box may be determined by a reference to the first bottom portion of the right lung that may correspond to a top edge of the liver bounding box of the liver organ and the second bottom portion of the rib region that may correspond to a bottom edge of the liver bounding box of the liver organ.

In accordance with an embodiment, the assistive apparatus 102 may be configured to localize the liver organ in the liver bounding box based on the first bottom portion of the right lung and the second bottom portion of the rib region of the body of the human subject 110. The liver bounding box may include the liver organ 112 of the human subject 102 and may be further utilized to segment the liver organ 112 from the CT images. The assistive apparatus 102 may be further configured to display the liver bounding box that comprises the liver organ 112 of the human subject 110 from the CT images on a display screen, such as the display device 116. In some embodiments, the liver bounding box that comprises the liver organ 112 of the human subject 110 from the CT images may be displayed on a display screen that is a part of the assistive apparatus 102. The liver organ 112 of the human subject 110 may be localized based on the anatomical structure information of the human subject 110. Alternatively stated, the liver organ localized by the assistive apparatus 102 may be user-specific. The localized liver organ may be utilized for computer-assisted diagnosis and therapy. The healthcare provider 114 may examine the liver organ 112 of the human subject 110 from the CT images based on the localization of the liver organ 112 in the liver bounding box in the CT images. The healthcare provider 114 may utilize the localized liver organ in the CT images for computer-aided diagnosis and therapy of the liver organ 112 of the human subject 110. The healthcare provider 114 may also utilize the localized liver organ of the human subject in liver anatomy evaluation of the human subject, which is patient-specific. The localized liver organ may be used for surgery planning and a pre-operative stage in image-guided surgeries.

In some embodiments, the assistive apparatus 102 may be configured to generate supplemental information that includes a set of markers assigned at a contour of the localized liver organ within the liver bounding box. The assistive apparatus may 102 control the display of the localized liver organ on a display device, such as the display device 116, such that the set of markers are visible at the contour of the localized liver organ. The display of the localized liver organ may be utilized by the healthcare provider 114 to assist in navigation of a surgical tool to reach to the localized liver organ within the body of the subject during a surgery. In accordance with an embodiment, the assistive apparatus 102 may be configured to localize the internal organ, such as the liver organ 112, based on a set of intra-operative CT images, during the surgery. The set of intra-operative CT images may comprise a plurality of CT images that may be captured during the surgery by an intra-operative CT scanner. The set of intra-operative CT images may be captured such that, radiations of the intra-operative CT scanner may not harm the human subject, such as the human subject 110.

Figure 2:
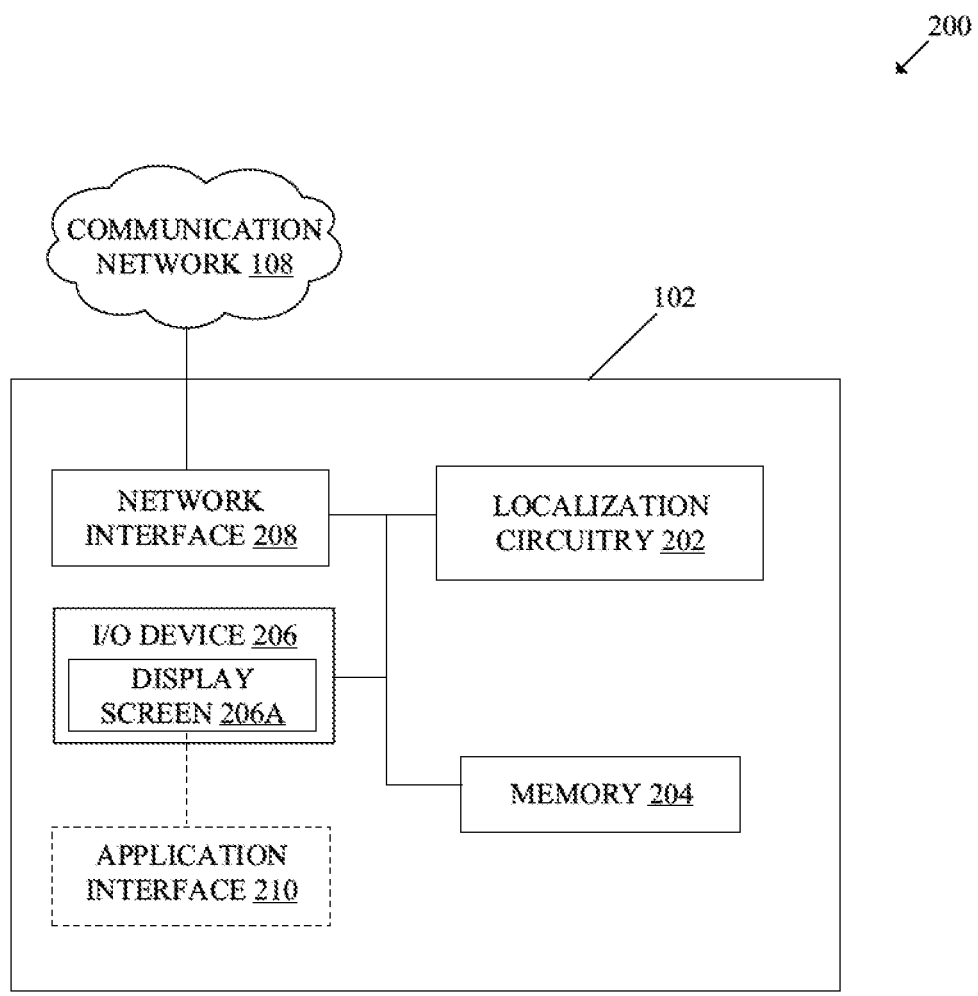
FIG. 2 illustrates a block diagram of an exemplary assistive apparatus for internal organ localization in CT images, in accordance with an embodiment of the disclosure.

FIG. 2 is a block diagram that illustrates an exemplary assistive apparatus for liver localization in CT images, in accordance with an embodiment of the disclosure. FIG. 2 is explained in conjunction with elements from FIG. 1. With reference to FIG. 2, there is shown the assistive apparatus 102. The assistive apparatus 102 may include a localization circuitry 202, a memory 204, an input/output (I/O) device 206 and a network interface 208. The I/O device 206 may include a display screen 206A, which may be utilized to render an application interface 210. The localization circuitry 202 may be communicatively coupled to the memory 204 and the I/O device 206. The localization circuitry 202 may be configured to communicate with the server 106 and the CT scanner 104, by use of the network interface 208.

The localization circuitry 202 may comprise suitable logic, circuits, and interfaces that may be configured to localize the liver organ 112 of the human subject 110 from CT images received from the CT scanner 104. The localization circuitry 202 may be configured to segment a pair of lung regions from the CT images by application of a first thresholding operation on the CT images of the human subject 110. The localization circuitry 202 may be further configured to determine a rib region and a spine region of the body of the human subject 110 in the CT images. The localization circuitry 202 may be configured to identify the anterior side and the posterior side of the body of the human subject 110 in the CT images, based on a comparison result. The localization circuitry 202 may be further configured to extract a liver bounding box that includes the liver organ 112, based on the identification of the first bottom portion of the right lung and the second bottom portion of the rib region in the CT images. The localization circuitry 202 may be implemented as a separate processor or a special purpose programmable circuitry in the assistive apparatus 102.

The memory 204 may comprise suitable logic, circuitry, and interfaces that may be configured to store a set of instructions executable by the localization circuitry 202. The memory 204 may be configured to store data of operating systems and associated applications. The memory 204 may be further configured to store the anatomical structure information of the internal organs of a human body. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The I/O device 206 may comprise suitable logic, circuitry, and interfaces that may be configured to receive an input from the healthcare provider 114 and provide an output to the healthcare provider 114 based on received input from the healthcare provider 114. For example, the I/O device 206 may be utilized to initialize the operation to localize the liver organ 112 of the body of the human subject 110 in the CT images based on a request from the healthcare provider 114 for anatomy evaluation of the liver organ 112. The I/O device 206 may comprise various input and output devices, which may be configured to communicate with the localization circuitry 202. Examples of the I/O device 206 may include, but are not limited to, a touch screen, a keyboard, a mouse, a joystick, a microphone, a display screen (for example, the display screen 206A), and a speaker.

The display screen 206A may comprise suitable logic, circuitry, and interfaces that may be configured to render the application interface 210 at the display screen 206A, for display of the liver bounding box that includes the liver organ 112 of the human subject 110. In accordance with an embodiment, the display screen 206A may be configured to receive input from the healthcare provider 114. In such a scenario, the display screen 206A may be a touch screen, which may enable the healthcare provider 114 to provide input. The touch screen may be at least one of a resistive touch screen, a capacitive touch screen, or a thermal touch screen. In accordance with an embodiment, the display screen 206A may receive the input through a virtual keypad, a stylus, a gesture-based input, or a touch-based input. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a smart-glass device, a see-through display, a projection-based display, an electrochromic display, or a transparent display.

The network interface 208 may comprise suitable logic, circuitry, and interfaces that may be configured to facilitate communication between the assistive apparatus 102, the CT scanner 104, and the server 106, via the communication network 108. The network interface 208 may be implemented by use of various known technologies to support wired or wireless communication of the assistive apparatus 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may communicate via wireless communication with networks, such as the Internet, an Intranet or a wireless network, such as a cellular telephone network, a wireless local area network (LAN), and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 210 may correspond to a user interface (UI) rendered on a display screen, such as the display screen 206A. The application interface 210 may display the liver bounding box that includes the liver organ 112 of the human subject 110. The liver bounding box that includes the liver organ 112 of the human subject 110 may be viewed from a plurality of view-points, by use of the application interface 210. An example of the application interface 210 may include, but is not limited to, a graphical user interface (GUI). The functions or operations executed by the assistive apparatus 102, as described in FIG. 1, may be performed by the localization circuitry 202. The operations executed by the localization circuitry 202 are further described, for example, in the FIGS. 3A to 3E, and FIGS. 4A and 4B.

Figure 3A:
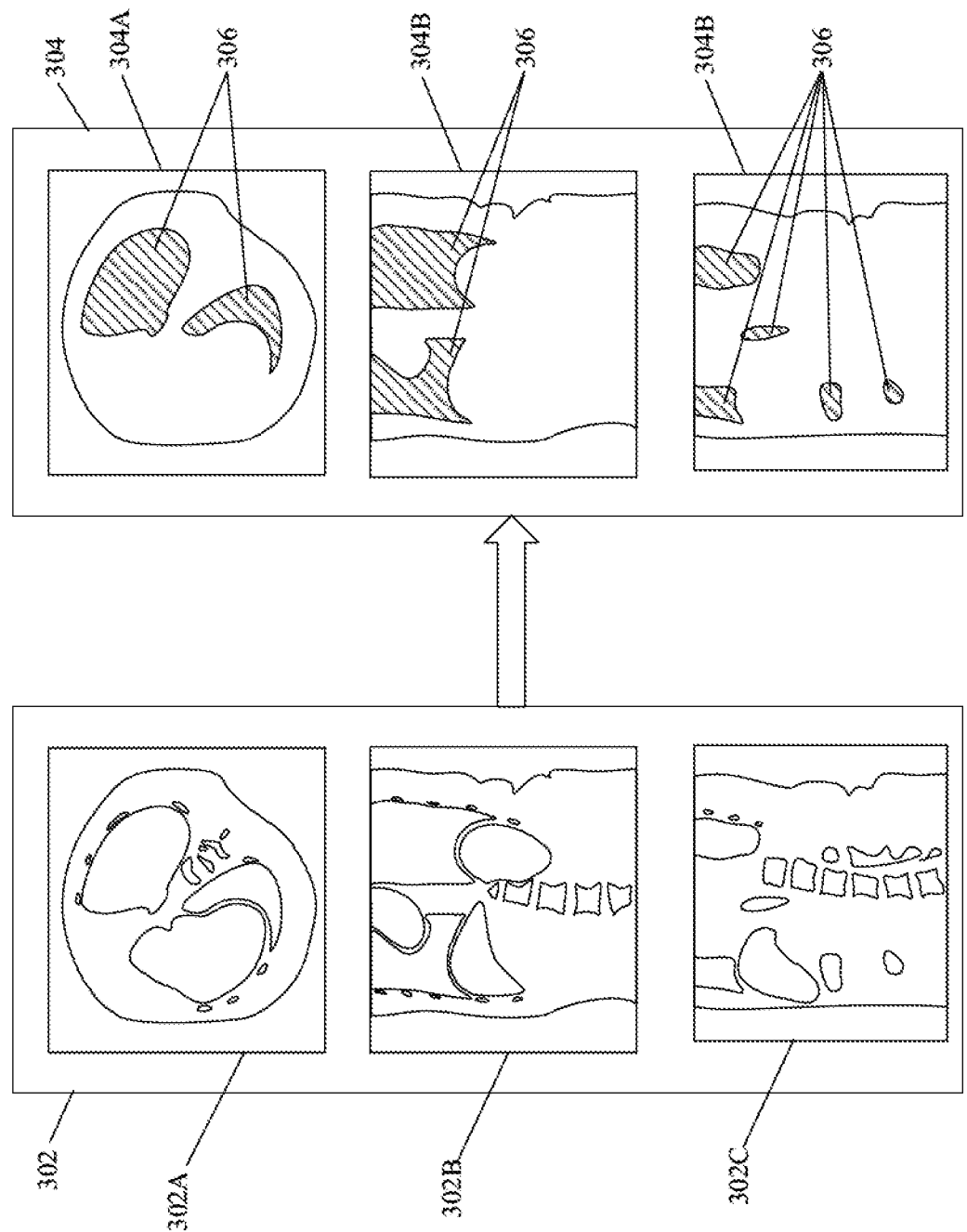
FIGS. 3A, 3B, 3C, 3D, and 3E, collectively, illustrate exemplary operations for liver localization in CT images, in accordance with an embodiment of the disclosure.

FIGS. 3A, 3B, 3C, 3D and 3E, collectively, illustrate exemplary scenario and operations for liver localization in CT images, in accordance with an embodiment of the disclosure. FIGS. 3A to 3E are explained in conjunction with elements from FIGS. 1 and FIG. 2. FIG. 3A illustrates segmentation of the pair of lung regions from the CT images, in accordance with an embodiment of the disclosure. With reference to FIG. 3A, there is shown CT images 302, an axial view CT image 302A, a coronal view CT image 302B and a sagittal view CT image 302C. With reference to FIG. 3A there is further shown, a first thresholded CT images 304. The first thresholded CT images 304 includes a first thresholded axial view CT image 304A, a first thresholded coronal view CT image 304B, and a first thresholded sagittal view CT image 304C. There is also shown a pair of lung regions 306.

In accordance with an embodiment, the localization circuitry 202 may be configured to receive the CT images 302 from the CT scanner 104. The CT images 302 may be visualized in different views, such as the axial view CT image 302A, the coronal view CT image 302B and the sagittal view CT image 302C. The axial view CT image 302A may be obtained with respect to at least one of a top and a bottom of the body of the human subject 110. The coronal view CT image 302B may be obtained with respect to at least one of an anterior and a posterior of the body of the human subject 110. Similarly, the sagittal view CT image 302C may be obtained with respect to at least one of a left and a right of the body of the human subject 110, where the left and the right of the body is considered with respect to the viewpoint of the human subject 110.

In accordance with an embodiment, the localization circuitry 202 may be configured to apply the first thresholding operation to the CT images 302, based on a first threshold intensity value. The first thresholded CT images 304 may be obtained based on the application of the first thresholding operation on the CT images 302. The first thresholded CT images 304 may be visualized via the first thresholded axial view CT image 304A, the first thresholded coronal view CT image 304B and the first thresholded sagittal view CT image 304C. The localization circuitry 202 may be configured to segment the pair of lungs regions 306 from the first thresholded CT images 304 based on the anatomical structure information of the human body. The pair of lung regions 306 may be a large and connected region in the first thresholded CT images 304 that may exhibit an intensity value that may be less than the first threshold intensity value and located inside the human body. The first thresholded axial view CT image 304A, the first thresholded coronal view CT image 304B and the first thresholded sagittal view CT image 304C may comprise the pair of lung regions 306, as shown in FIG. 3A. In the first thresholded sagittal view CT image 304C, the pair of lung regions 306 may be visible as scattered sub-regions as a result of presence of other internal organs of the human subject 110 that partially covers the pair of lung regions 306 in the sagittal view. The pair of lung regions 306 may comprise a left lung and the right lung of the body of the human subject 110. For example, as shown in FIG. 3A, the localization circuitry 202 may segment the pair of lung regions 306 based on the intensity value exhibited by the pair of lung regions 306 that is less that the first threshold intensity value in the first thresholded CT images 304 and located inside the human body.

Figure 3B:
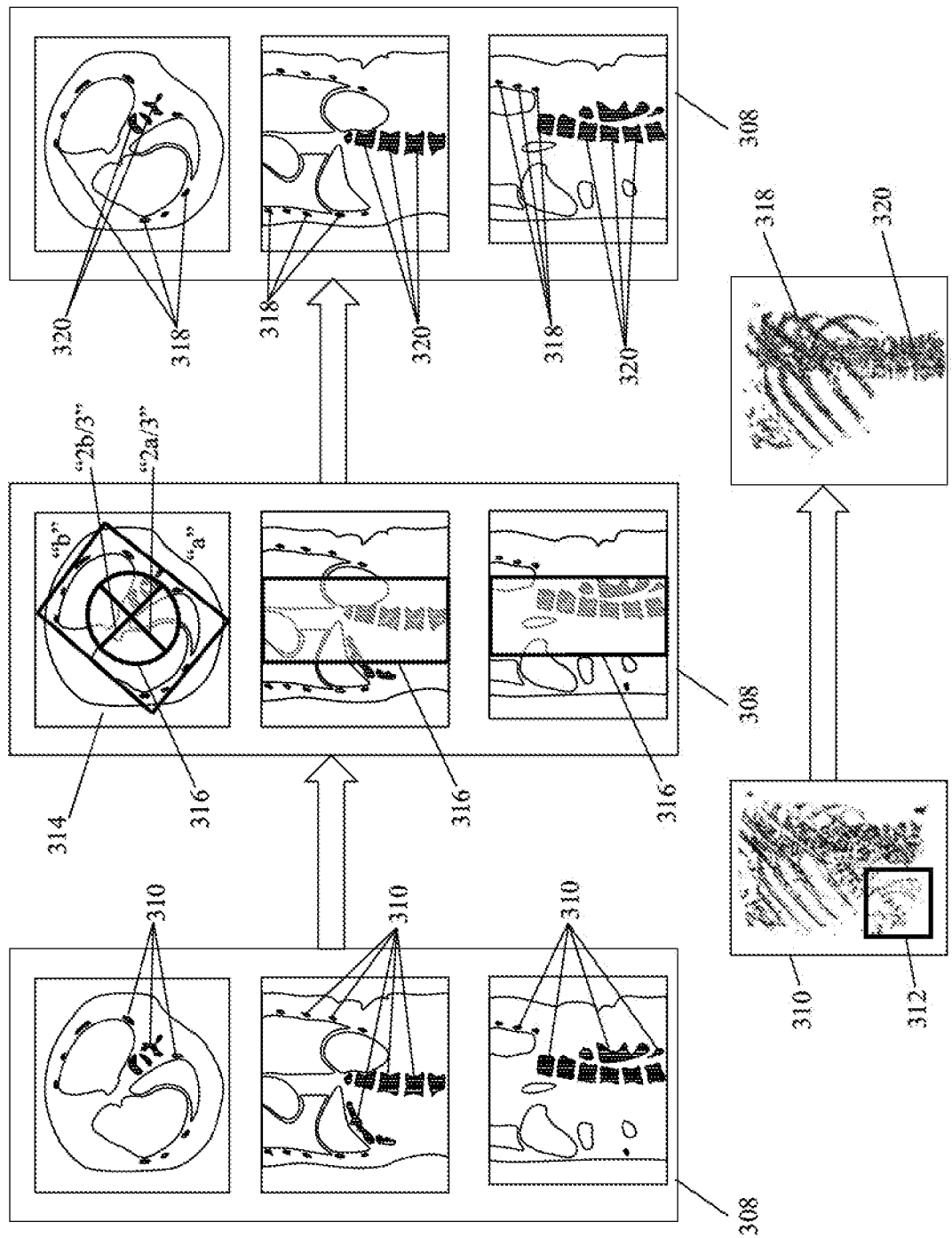

FIG. 3B illustrates exemplary operation of the extraction of the rib region and the spine region of the body of the human subject 110, in accordance with an embodiment of the disclosure. FIG. 3B is explained in conjunction with elements from FIGS. 1, 2, and 3A. With reference to FIG. 3B, there is shown a second thresholded CT images 308, a skeletal region 310 of the body of the human subject 110 and other body portions 312 in the skeletal region 310 that are different from the rib region and spine region. There is further shown a bounding region 314, a mask 316, the rib region 318 and the spine region 320 of the body of the human subject 110 in different views.

In accordance with an embodiment, the localization circuitry 202 may be configured to apply the second thresholding operation on the CT images 302 to generate the second thresholded CT images 308. The second thresholding operation may be applied to detect the skeletal region 310 of the body of the human subject 110 in the CT images 302, based on a second threshold intensity value. The skeletal region 310 in the second thresholded CT images 308 may exhibit an intensity value that is greater than the second threshold intensity value. The detected skeletal region 310 may comprise a rib region, a spine region and other body portions, such as the other body portions 312, different from the rib region and the spine region that are a part of the skeletal region 310, as shown in FIG. 3B. The localization circuitry 202 may be configured to apply the mask 316 on the other body portions 312 different from the rib region and the spine region. The localization circuitry 202 may be configured to apply the mask 316 based on the dimensions of the bounding region 314. For example, the length and breadth of the bounding region 314 may be "a" and "b", respectively, and in such a scenario, the dimensions of the generated mask 316 may be "$\frac{2}{3}^{rd}$" of "a" and "$\frac{2}{3}^{rd}$" of "b", respectively, as shown in FIG. 3B.

The applied mask 316 may comprise the other body portions 312 different from the rib region and the spine region of the body of the human subject 110, for example, some tissue or organs of the human body that are disconnected from the rib region and the spine region of the human body. The localization circuitry 202 may be configured to remove the other body portions 312 different from the rib region and the spine region of the body of the human subject 110 from an area of the applied mask 316, which intersect with the mask 316 and disconnect with the rib region and the spine region of the human body. Alternatively stated, the localization circuitry 202 may eliminate the other body portions 312 different from the rib region and the spine region of the body of the human subject 110 by applying the mask 316 to the second thresholded CT images 308. The localization circuitry 202 may then determine the rib region 318 and the spine region 320 after removal of the other body portions 312 from the skeletal region 310. For example, as shown in FIG. 3B, the rib region 318 and the spine region 320 is determined from the second thresholded CT images 308 based on the removal of the other body portions 312.

Figure 3C:
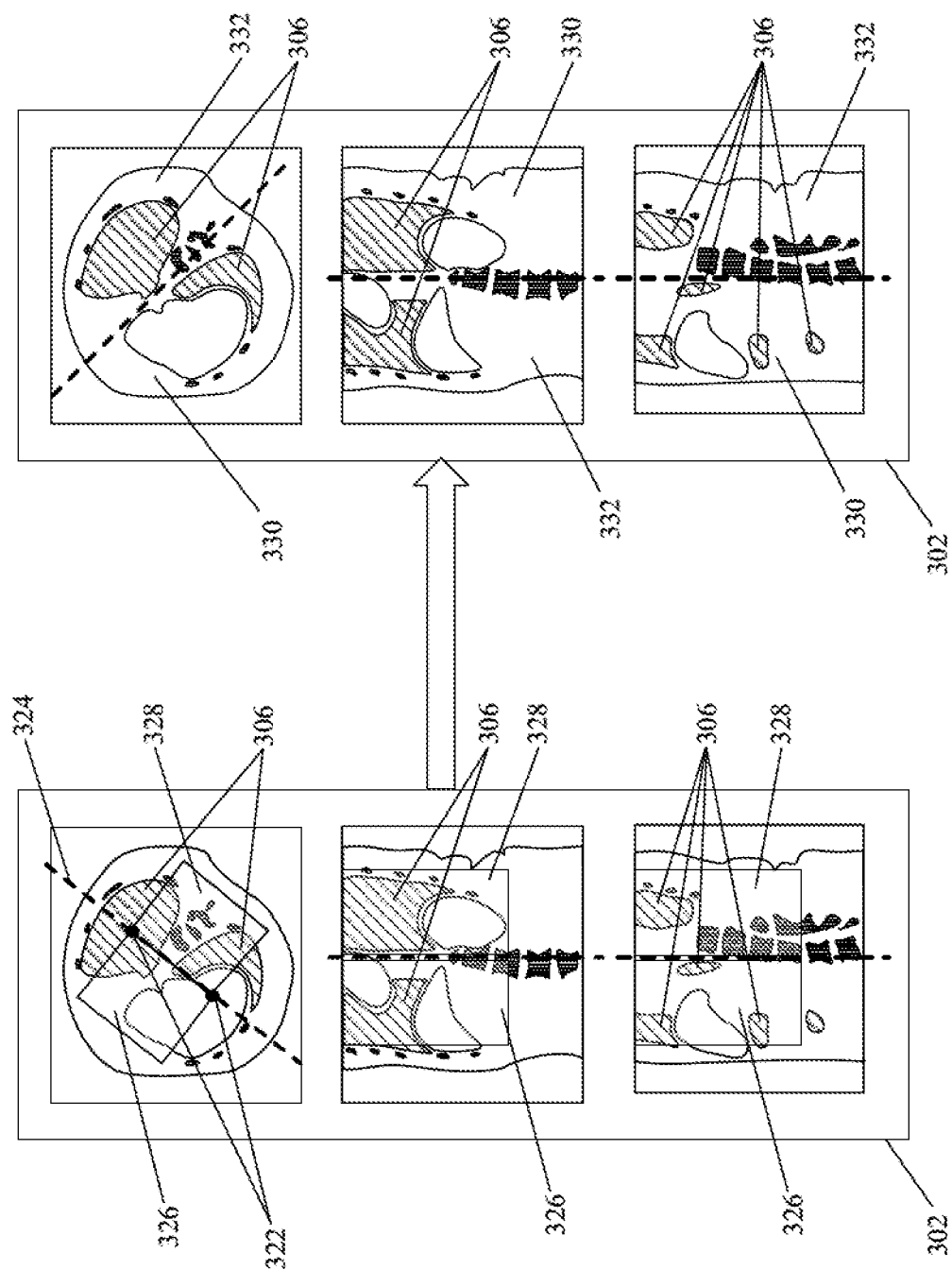

FIG. 3C illustrates exemplary operation of the determination of the right side of the body of the human subject 110, in accordance with an embodiment of the disclosure. FIG. 3C is explained in conjunction with elements from FIGS. 1, 2, 3A and 3B. With reference to FIG. 3C, there is shown a pair of centroids 322 for the pair of lung regions 306, a plane 324, a first half 326 and a second half 328 of the CT images 302. There is further shown a right portion 330 and a left portion 332 of the body of the human subject 110 with respect to the viewpoint from which the human subject 110 is observed. In accordance with an embodiment, the localization circuitry 202 may be configured to position the pair of centroids 322 for the pair of lung regions 306 in the CT images 302. Alternatively stated, each of the pair of centroids 322 may be positioned for each lung in the pair of lung regions 306 in CT images 302.

The localization circuitry 202 may be configured to mark the plane 324 formed by the pair of centroids 322 for each lung in the pair of lung regions 306 in the CT images 302. Additionally, the localization circuitry 202 may be configured to identify the plane 324 formed by the pair of centroids 322 for each lung in the pair of lung regions 306 in the 3D representation of the anatomical portion of the body of the human subject 110. The identified plane 324 may separate the portion of the 3D representation of the anatomical portion of the body of the human subject 110 to a first region and a second region. The separated first region and the second region of the portion of the 3D representation may also bifurcate the CT images into two halves based on the identified plane. The first region of the portion of the 3D representation may corresponds to the first half 326 of the bifurcated two halves of the CT images and the second region of the portion of the 3D representation corresponds to the second half 328 of the bifurcated two halves of the CT images.

The localization circuitry 202 may be configured to calculate a first number of voxels from only the determined rib region 318 and the spine region 320 present in the first region of the 3D representation. The localization circuitry 202 may be further configured to calculate a second number of voxels from only the determined rib region 318 and the spine region 320 present in the second region of the 3D representation.

The localization circuitry 202 may be configured to compare the first number of voxels from the determined rib region 318 and the spine region 320 in the first region and the second number of voxels from the determined rib region 318 and the spine region 320 in the second region of the 3D representation. The localization circuitry 202 may be configured to generate a comparison result for the first number of voxels within the first region and the second number of voxels within the second region of the portion of the 3D representation. The comparison result may be generated based on a comparison between the first number of voxels in the first region and the second number of voxels in the second region of the portion of the 3D representation from only the determined rib region 318 and the spine region 320. The comparison result may indicate whether the first number of voxels is greater than the second number of voxels or the first number of voxels is less than the second number of voxels. The generated comparison result may be further utilized to determine an anterior side and a posterior side of the body of the human subject 110. According to the stored anatomical structure information of the human body, the number of voxels for the rib region 318 and the spine region 320 (e.g. bone voxels) in the anterior side of the body of the human subject 110 may be less than the number of voxels for the rib region 318 and the spine region 320 in the posterior side of the body of the human subject 110. Alternatively stated, the number of voxels for the rib region 318 and the spine region 320 (e.g. bone voxels) in the anterior side will be less than the number of voxels for the rib region 318 and the spine region 320 in the posterior side, because more bone regions, such as the spine region 320, is expected to be present in the posterior side of the human body. The localization circuitry 202 may thus identify the first region as the anterior side and the second region as the posterior side of the human subject 110 when the first number of voxels from the rib region 318 and the spine region 320 in the first region is less than the second number of voxels in the second region. In accordance with another embodiment, the localization circuitry 202 may be configured to identify the second region as the anterior side and the first region as the posterior side of the human subject 110 in the 3D representation. In such a scenario, the second number of voxels from the rib region 318 and the spine region 320 in the second region may be less than the first number of voxels from the rib region and the spine region in the first region of the portion of the 3D representation.

In accordance with an embodiment, as shown in FIG. 3C, the localization circuitry 202 may be configured to identify the first half 326 of the CT images as the anterior side of the body of the human subject 110. The first half 326 (of CT images) corresponds to the first region (of the portion of the 3D representation), based on the comparison result. Additionally, as shown in FIG. 3C, the localization circuitry 202 may be configured to identify the second half 328 of the CT images as the posterior side of the body of the human subject 110. The second half 328 (of CT images) corresponds to the second region (of the portion of the 3D representation), based on the comparison result. In such a scenario, the first number of voxels in the first region of the portion of the 3D representation from the rib region 318 and the spine region 320 may be less than the second number of voxels in the second region of the portion of the 3D representation.

In accordance with an embodiment, the localization circuitry 202 may be further configured to determine the right portion 330 and the left portion 332 of the body of the human subject 110 in the CT images 302. The localization circuitry 202 may be configured to determine the right portion 330 and the left portion 332 of the body of the human subject 110 in the CT images 302 based on the determined anterior side and a posterior side as well as a superior side and an interior side of the body of the human subject 110. The right side of the body of the human subject 110 may be determined based on the stored anatomical structure information of the human body. The right side of the body of the human subject 110 may comprise the right lung of the body of the human subject 110 in the CT images. A part of the pair of lung regions 306 that may be present in the right side of the body may be identified as the right lung.

Figure 3D:
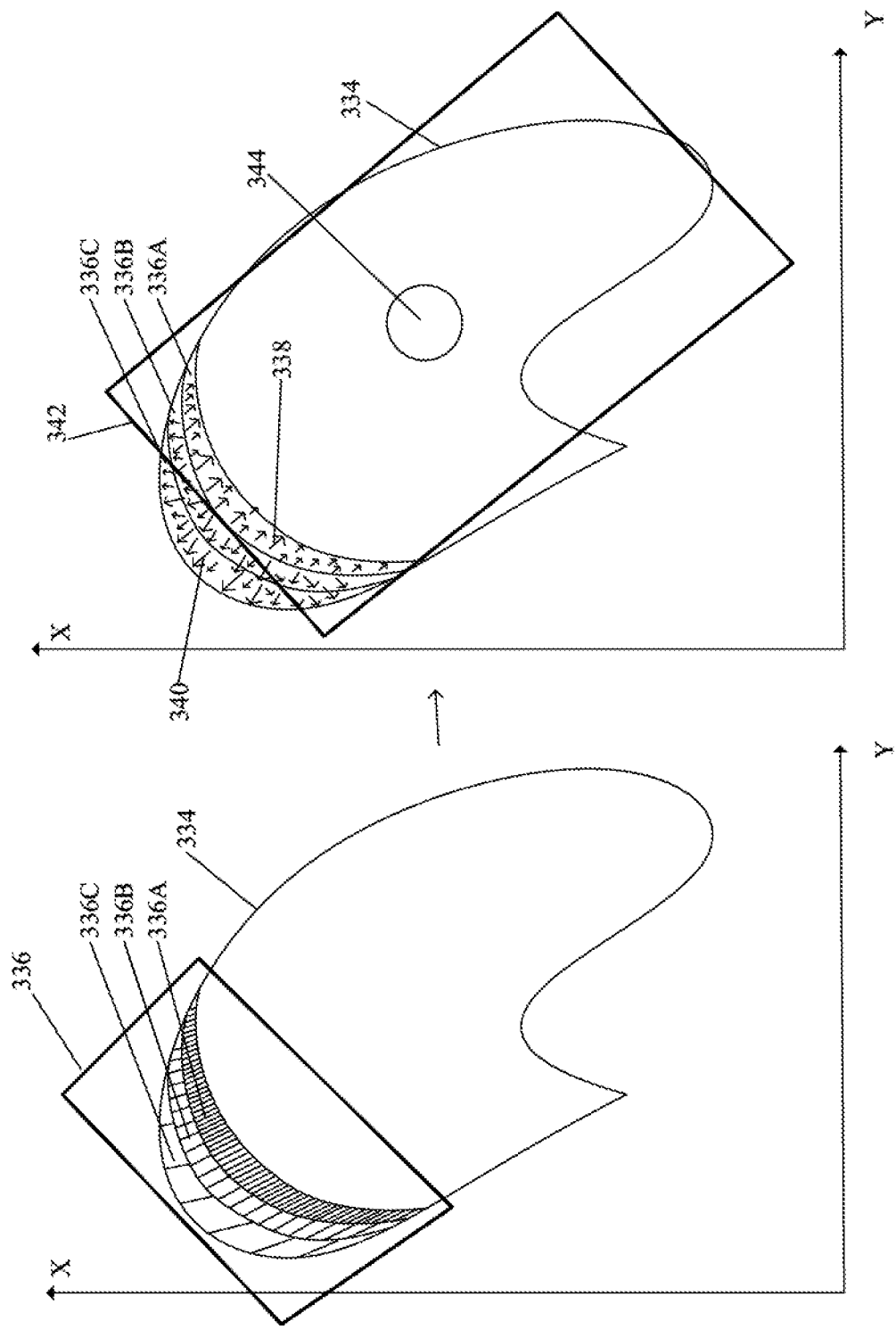

FIG. 3D illustrates exemplary operation of the determination of a bottom portion of a right lung of a body of a human subject, in accordance with an embodiment of the disclosure. With reference to FIG. 3D, there is shown a minimal position along a specific axis of right lung 334, a first bottom region 336 of the right lung 334, a first set of pixels 336A, a second set of pixels 336B and a third set of pixels 336C of the first bottom region 336 of the right lung 334. There is further shown a first set of gradient vectors 338, a second set of gradient vectors 340, a second bottom region 342 of the right lung 334 and the first bottom portion 344 of the right lung 334.

In accordance with an embodiment, the localization circuitry 202 may be configured to compute, in the CT images, a minimal position values on the surface of the right lung 334 located in the right side of the body of the human subject 110. The distribution of the plurality of position values may be computed at the position of a plurality of pixels on the surface of the right lung 334 along a specific axis, for example, "Z" axis, of a 3D coordinate space. The distribution of the plurality of position values may be computed based on a minimum position value of the plurality of pixels with respect to the "Z" axis of the 3D coordinate space. The first bottom region 336 of the right lung may comprise the first set of pixels 336A, the second set of pixels 336B and the third set of pixels 336C. The first bottom region 336 may not be an accurate bottom surface of the right lung and may comprise some portions of other regions of the right lung, such as side wall the right lung. The first set of pixels 336A of the first bottom region 336 may exhibit higher intensity value than the second set of pixels 336B but a lower intensity value than the third set of pixels 336C in the distribution of the plurality of position values. The second set of pixels 336B may exhibit lowest intensity value in the distribution of the plurality of position values as compared to the first set of pixels 336A and the third set of pixels 336C. The third set of pixels 336C may exhibit highest intensity value in the distribution of the plurality of position values as compared to the first set of pixels 336A and the third set of pixels 336C. The second set of pixels 336B and the third set of pixels 336C may correspond to regions of the body that are not a part of the accurate bottom surface of the right lung 334. The first set of pixels 336A may be a part of the accurate bottom surface of the right lung.

In accordance with an embodiment, the localization circuitry 202 may be further configured to compute a plurality of gradient vectors for the first set of pixels 336A, the second set of pixels 336B and the third set of pixels 336C of the first bottom region 336 of the right lung 334. The first set of pixels 336A may be associated with the first set of gradient vectors 338. The first set of gradient vectors 338 may be computed based on a magnitude of position levels of the first set of pixels 336A. Similarly, the second set of pixels 336B and the third set of pixels 336C may be associated with the second set of gradient vectors 340. The second set of gradient vectors 340 may be computed based on a magnitude of position levels of the second set of pixels 336B and the third set of pixels 336C. The first set of gradient vectors 338 associated with the first set of pixels 336A may point inwards with respect to the right lung 334. Whereas, the second set of gradient vectors 340 associated with the second set of pixels 336B and the third set of pixels 336C, may point outwards with respect to the right lung 334.

In accordance with an embodiment, the localization circuitry 202 may be configured to remove the second set of pixels 336B and the third set of pixels 336C associated with the second set of gradient vectors 340. The localization circuitry 202 may be configured to obtain the second bottom region 342 of the right lung based on the removal of the second set of pixels 336B and the third set of pixels 336C associated with the second set of gradient vectors 340. The second bottom region 342 may the accurate bottom surface of the right lung 334. Thus, the localization circuitry 202 may be configured to detect the first bottom portion 344 of the right lung based on the second bottom region 342. The first bottom portion 344 of the right lung corresponds to the point with the highest position of the bottom layer of the right lung 334 in the second bottom region 342, as shown. The first bottom portion 344 of the right lung 334 may be the accurate and actual identified bottom portion of the right lung 334.

Figure 3E:
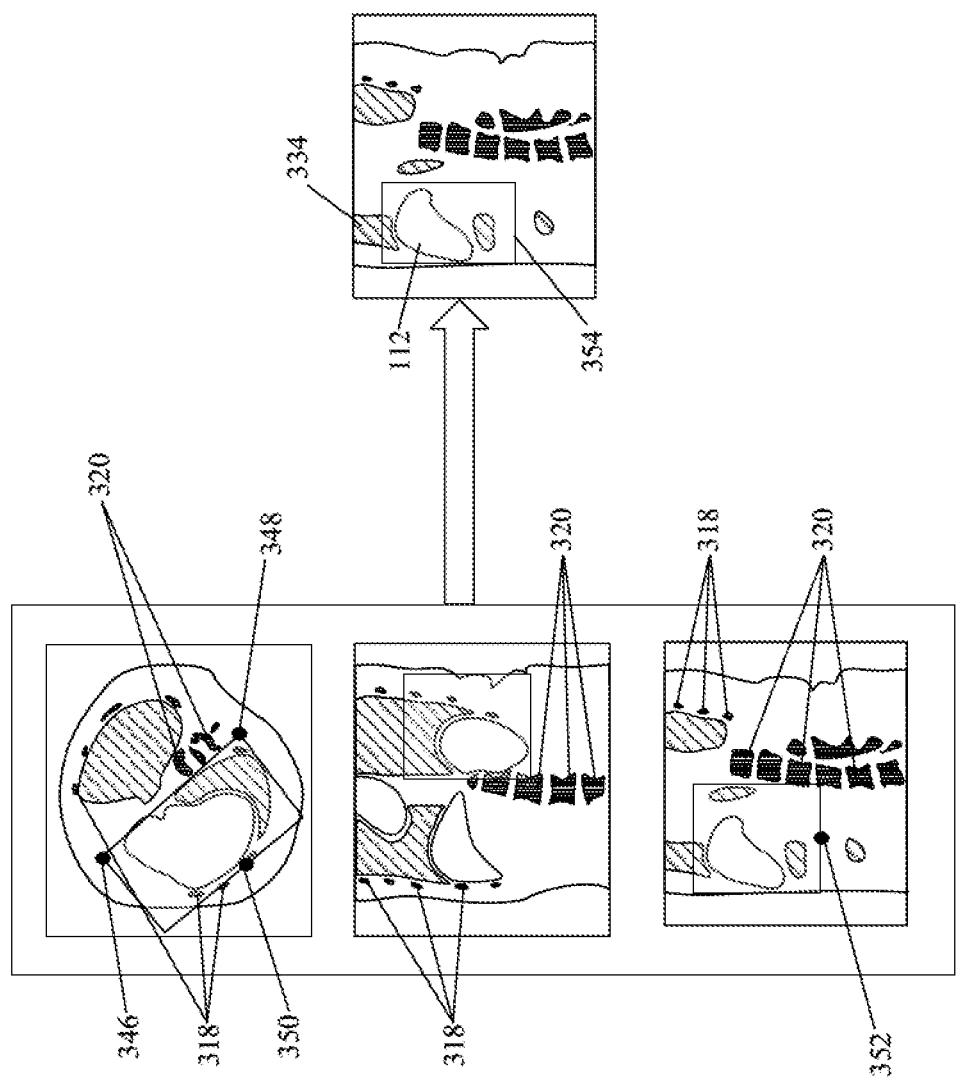

FIG. 3E illustrates exemplary operation of the extraction of a liver bounding box that includes a liver organ of the body of the human subject 110, in accordance with an embodiment of the disclosure. With reference to FIG. 3E, there is shown a front side 346 of the rib region 318, a rear side 348 of the rib region 318, a right side 350 of the rib region 318, a second bottom portion 352 of rib region 318, a liver bounding box 354 and the liver organ 112 of the body of the human subject 110.

In accordance with an embodiment, the localization circuitry 202 may be configured to identify the second bottom portion 352 of the rib region 318 based on the front side 346 of the rib region 318, the rear side 348 of the rib region 318 and the right side 350 of the rib region 318 in the CT images. The front side 346 of the rib region 318, the rear side 348 of the rib region 318 and the right side 350 of the rib region 318 may be identified based on identification of the right side, anterior side and the posterior side of the body of the human subject 110. The front side 346 of the rib region 318, the rear side 348 of the rib region 318 and the right side 350 of rib region 318 may be identified further based on stored anatomical structure information of the human body.

In accordance with an embodiment, the localization circuitry 202 may be configured to determine an area and positioning of the liver bounding box 354 on the CT images. The area and positioning of the liver bounding box 354 may be determined. Such determination may be done by a reference to the first bottom portion 344 (shown in FIG. 3D) of the right lung 334 and the second bottom portion 352 of the rib region. The first bottom portion 344 (shown in FIG. 3D) of the right lung 334 corresponds to a top edge of the liver bounding box 354 of the liver organ 112. The second bottom portion 352 of the rib region may correspond to a bottom edge of the liver bounding box 354 of the liver organ 112. The determined area and positioning of the liver bounding box 354 may be utilized for segmentation of the liver organ 112 from the CT images.

In accordance with an embodiment, the localization circuitry 202 may localize the liver organ 112 of the body of the human subject 110 in the liver bounding box 354. The liver bounding box 354 may include the liver organ 112 of the human subject 102 and may be further utilized to segment the liver organ 112 from the CT images 302. The localization circuitry 202 may be configured to extract the liver bounding box 354 that includes the liver organ 112 of the body of the human subject 110. The liver bounding box 354 may be extracted based on the identification of the second bottom portion 352 of rib region 318 and the first bottom portion 344 (of FIG. 3D) of the right lung 334 in the CT images 302. The liver bounding box 354 that includes the liver organ 112 of the body of the human subject 110 may be displayed on a display screen, such as the display screen 206A, or an external display device, such as the display device 116. The healthcare provider 114 may examine the liver organ 112 of the human subject 110 from the CT images 302 based on the localization of the liver organ 112 in the liver bounding box 354 in the CT images 302.

In accordance with an embodiment, the localization circuitry 202 may be further configured to generate supplemental information that includes a set of markers assigned at a contour of the localized liver organ within the liver bounding box. The localization circuitry may be configured to control display of the localized liver organ on the display device, such as the display screen 206A or the display device 116, such that the set of markers may be visible at the contour of the localized liver organ. The displayed localized liver organ may assist the healthcare provider 114 in navigation of a surgical tool to reach to the localized liver organ within the body of the subject during a surgery.

Figure 4A:
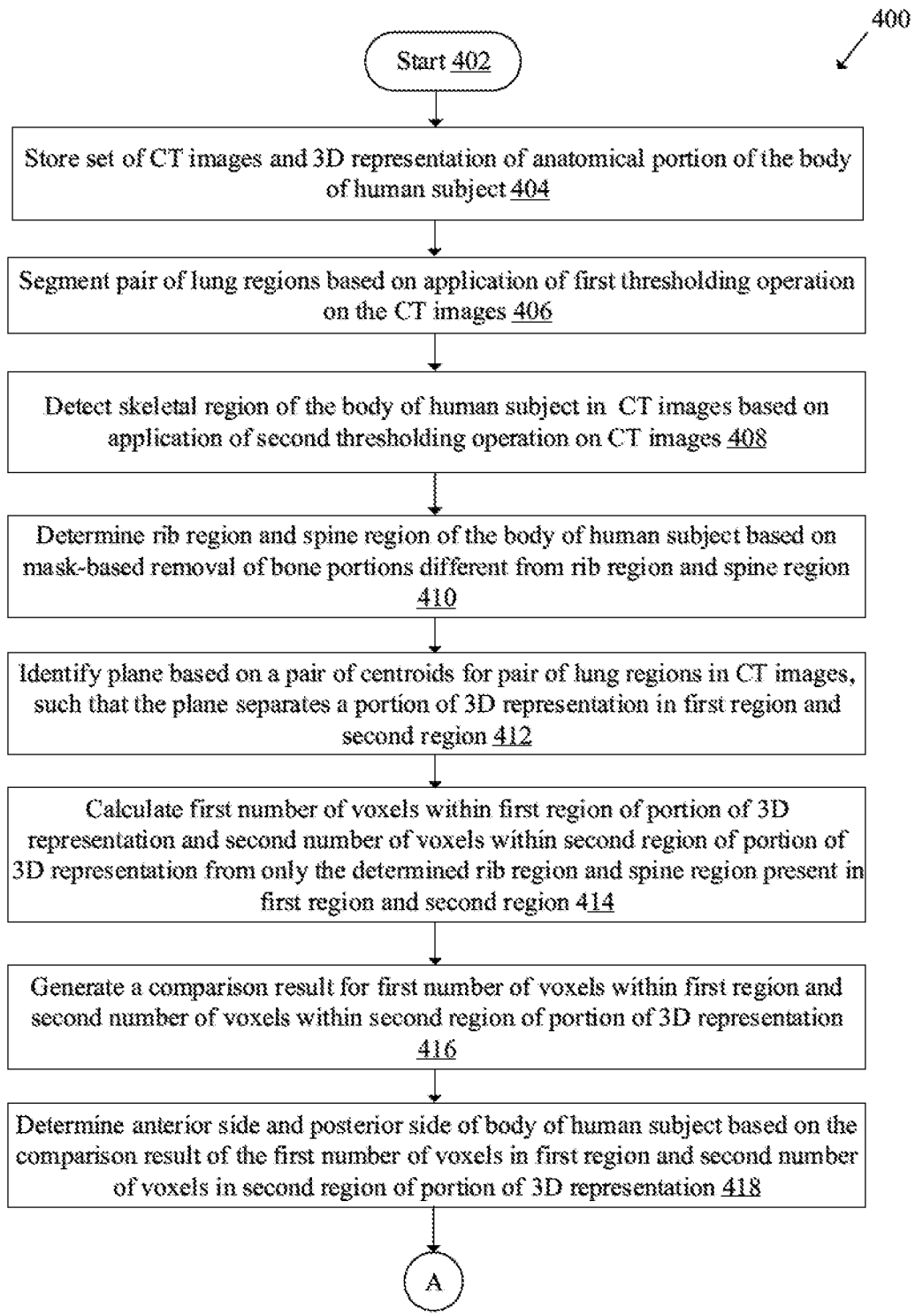
FIGS. 4A and 4B, collectively, illustrate a flow chart that depicts exemplary operations for liver localization in CT images, in accordance with an embodiment of the disclosure.
Figure 4B:
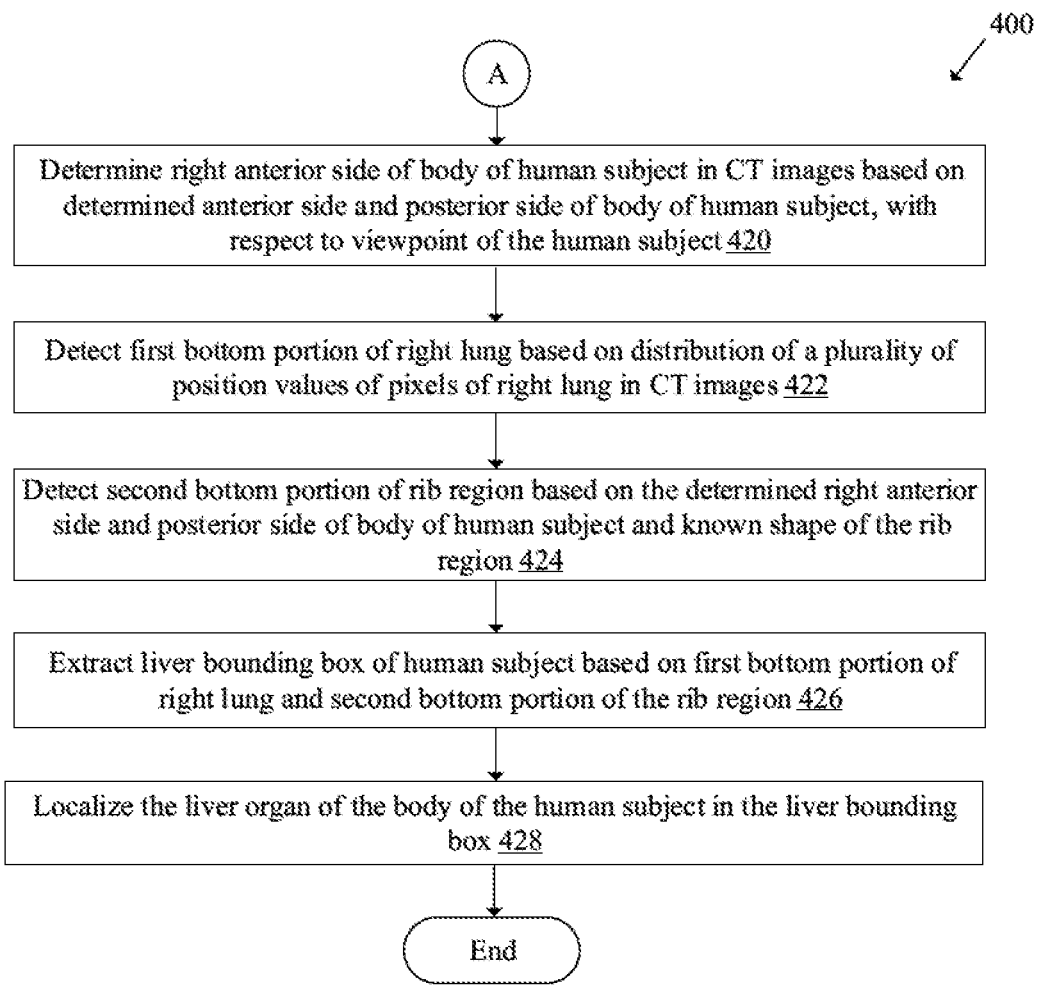

FIGS. 4A and 4B are a flowchart that, collectively, illustrates exemplary operations for liver localization in CT images, in accordance with an embodiment of the disclosure. With reference to FIGS. 4A and 4B, there is shown a flowchart 400. The flowchart 400 is described in conjunction with FIGS. 1, 2, and 3A to 3E. The operations from 404 to 428 may be implemented in the assistive apparatus 102. The operations of the flowchart 400 may start at 402 and proceed to 404.

At 404, the CT images and the 3D representation of an anatomical portion of the body of the human subject 110 may be stored in the assistive apparatus 102. For example, the anatomical portion may be a body portion from neck to waist region that includes rib cage and abdominal organs. The CT images may be received from the CT scanner 104. The CT images of the body of the human subject 110 may be captured by the CT scanner. The stored 3D representation may also comprise different representations of the plurality of internal organs and associated anatomical regions of the body of the human subject 110. For example, as shown in FIG. 3A, the localization circuitry 202 may receive the CT images 302 that may be visualized via the axial view CT image 302A, the coronal view CT image 302B and the sagittal view CT image 302C from the CT scanner 104.

At 406, the pair of lung regions may be segmented based on application of the first thresholding operation on the CT images 302. The localization circuitry 202 may be configured to segment the pair of lung regions 306 based on the application of the first thresholding operation on the CT images 302. The first thresholding operation may be applied based on a first threshold intensity value. For example, as shown in FIG. 3A, the pair of lung regions 306 in the first thresholded CT images 304 may exhibit an intensity value that is less than the first threshold intensity value and located inside human body.

At 408, the skeletal region of the body of the human subject 110 may be detected in the CT images 302 based on the second thresholding operation on the CT images 302. The localization circuitry 202 may be configured to apply the second thresholding operation on the CT images 302, based on a second threshold intensity value. The skeletal region in the second thresholded CT images may exhibit an intensity value that may be greater than the second threshold intensity value. For example, as shown and described in FIG. 3B, the detected skeletal region 310 in the second thresholded CT images 308 may exhibit an intensity value that is greater than the second threshold intensity value. The detected skeletal region 310 may comprise a rib region, a spine region and other body portions, such as the other body portions 312, different from the rib region and the spine region that are a part of the skeletal region 310, as shown in FIG. 3B At 410, the rib region and the spine region of the body of the human subject 110 may be determined based on the mask-based removal of other body portions different from the rib region and the spine region. As shown and described in FIG. 3B, the localization circuitry 202 may be configured to apply the mask 316 based on the dimensions of the bounding region 314 of the CT images 302. The applied mask may comprise the other body portions 312 different from the rib region and the spine region of the body of the human subject 110. The other body portions 312 different from the rib region and the spine region of the body of the human subject 110 may be some tissue or organs of the human body that are disconnected from the rib region and the spine region of the human body. The localization circuitry 202 may remove the masked other body portions 312 different from the rib region and the spine region of the body of the human subject 110 from the CT images. The localization circuitry 202 may determine the rib region 318 and the spine region 320 based on the removal of the other body portions 312 different from the rib region 318 and the spine region 320 from the skeletal region 310, for example as shown in FIG. 3B.

At 412, a plane may be identified based on a pair of centroids for the pair of lung regions in the CT images such that the plane separates a portion of the 3D representation in a first region and a second region. The localization circuitry 202 may be configured to position the pair of centroids for the pair of lung regions in the CT images such that a centroid may be positioned for the right lung and a centroid may be positioned for the left lung. The localization circuitry 202 may be further configured to identify the plane formed by the centroid of the right lung and the centroid of the left lung. The localization circuitry 202 may be configured to separate a portion of the 3D representation of the anatomical portion of the body of the human subject 110 to the first region and the second region based on the identified plane. The separated first region and the second region of the portion of the 3D representation may also bifurcate the CT images 302 into two halves based on the identified plane 324. For example, as shown and described in FIG. 3C, the first region of the portion of the 3D representation may correspond to the first half 326 of the bifurcated two halves of the CT images. The second region of the portion of the 3D representation may correspond to the second half 328 of the bifurcated two halves of the CT images based on the identified plane 324.

At 414, a first number of voxels within a first region of a portion of the 3D representation and a second number of voxels within a second region of the portion of the 3D representation may be calculated. The first number of voxels and the second number of voxels may be calculated from only the determined rib region 318 and the spine region 320 present in the first region and the second region of the portion of the 3D representation. For example, as shown and described in FIG. 3C, the localization circuitry 202 may be configured to calculate the first number of voxels within the first region and the second number of voxels within the second region of the portion of the 3D representation.

At 416, a comparison result may be generated for the first number of voxels within the first region and the second number of voxels within the second region of the portion of the 3D representation. The localization circuitry 202 may be configured to generate the comparison result based on the comparison between the first number of voxels in the first region and the second number of voxels in the second region of the portion of the 3D representation from only the determined rib region 318 and the spine region 320. The generation of the comparison result by the localization circuitry 202, is shown and described, for example, in FIG. 3C.

At 418, the anterior side and the posterior side of the body of the human subject 110 may be determined based on the comparison result of the first number of voxels from the rib region 318 and the spine region 320 in the first region and the second number of voxels from the rib region 318 and the spine region 320 in the second region of the portion of the 3D representation. The localization circuitry 202 may be configured to determine the anterior side and the posterior side of the body of the human subject 110 based on the stored anatomical structure information of the human body. For example, as shown in FIG. 3C, the localization circuitry 202 may be configured to identify the first region as the anterior side and the second region as the posterior side of the human subject 110 when the number of voxels from the rib region and the spine region in the first region may be less than the number of voxels from the rib region and the spine region in the second region of the portion of the 3D representation. Additionally, the localization circuitry 202 may be configured to identify the first half 326 of the bifurcated two halves of the CT images as the anterior side. Similarly, the second half 328 of the bifurcated two halves as the posterior side of the human subject 110, based on the generated comparison result, as shown, for example, as shown in FIG. 3C.

At 420, the right side of the body of the human subject 110 may be determined in the CT images 302, based on the determined anterior side and the posterior side as well as the superior side and interior side of the body of the human subject 110 with respect to the human subject 110. The determination of the right side of the body of the human subject is shown and described, for example in FIG. 3C. The determined right side of the body of the human subject 110 may comprise the right lung 334.

At 422, the first bottom portion of the right lung may be detected based on a distribution of a plurality of minimal position values of pixels along a specific axis of a right lung in the CT images. The localization circuitry 202 may be configured to detect the first bottom portion 344 of the right lung 334. The localization circuitry 202 may be configured to compute a distribution of a plurality of position values of the surface of the right lung 334 located in the right side of the body of the human subject 110, as shown and described in FIG. 3D. The distribution of the plurality of position values of the surface of the right lung 334 may be computed with respect to a position of a set of pixels in the right lung 334 along a specific axis. The detection of the first bottom portion 344 of the right lung 334 is shown and described, for example in FIG. 3D.

At 424, the second bottom portion of the rib region 318 may be detected based on the determined right side, anterior side and the posterior side of the body of the human subject 110 and the known shape of the rib region. The localization circuitry 202 may be configured to detect the second bottom portion 352 of the rib region 318 further based on the front side 346 of the rib region 318, the rear side 348 of the rib region 318 and the right side 350 of the rib region 318 with respect to the human subject 110, as shown in FIG. 3E. The front side 346 of the rib region 318, the rear side 348 of the rib region 318 and the right side 350 of the rib region 318 may be identified further based on stored anatomical structure information of the human body with respect to the anatomical plane. The detection of the second bottom portion 352 of the rib region 318 is shown and described, for example in FIG. 3E.

At 426, the liver bounding box of the human subject 110 may be extracted based on the first bottom portion 344 of the right lung and the second bottom portion 352 of the rib region 318. The localization circuitry 202 may be configured to extract the liver bounding box 354 of the human subject 110 that includes the liver organ 112 of the body of the human subject 110, as shown for example in FIG. 3E. The liver bounding box 354 may be extracted based on the determination of the second bottom portion 352 of rib region 318 and the first bottom portion 344 of the right lung 334 in the CT images 302. The localization circuitry 202 may be configured to determine the area and positioning of the liver bounding box 354 on the CT images. The area and positioning of the liver bounding box 354 may be determined by a reference to the first bottom portion 344 of the right lung 334 and the second bottom portion 352 of the rib region. The first bottom portion 344 of the right lung 334 may correspond to a top edge of the liver bounding box 354 of the liver organ 112, whereas the second bottom portion 352 of the rib region may indicate a bottom edge of the liver bounding box 354 of the liver organ 112.

At 428, the liver organ of the body of the human subject 110 may be localized in the liver bounding box 354. The localization circuitry 202 may be configured to localize the liver organ 112 of the body of the human subject 110 in the liver bounding box 354, as shown, for example in FIG. 3E. The liver bounding box 354 may include the liver organ 112 of the human subject 102 and may be further utilized to segment the liver organ 112 from the CT images 302. The healthcare provider 114 may examine the liver organ 112 of the human subject 110 from the CT images 302 based on the localization of the liver organ 112 in the liver bounding box 354 in the CT images 302. The control may pass to end.

Various embodiments of the disclosure may provide an assistive apparatus (such as the assistive apparatus 102) that may include a memory (such as the memory 204) and a localization circuitry (such as the localization circuitry 202). The memory may be configured to store a three dimensional (3D) representation of an anatomical portion of a body of a subject, and computed tomography (CT) images. The 3D representation of the anatomical portion of the body of the subject and the CT images may comprise different representations of a plurality of internal organs and associated anatomical regions of the body. The localization circuitry may be configured to determine a rib region and a spine region of the body in CT images. The localization circuitry may be further configured to calculate a first number of voxels within a first region of a portion of the 3D representation and a second number of voxels within a second region of the portion of the 3D representation. The first region and the second region may also bifurcate the CT images into two halves. The first number of voxels and the second number of voxels may be calculated from only the determined rib region and the spine region present in the first region and the second region. The localization circuitry may be configured to generate a comparison result for the first number of voxels within the first region and the second number of voxels within the second region. The generated comparison result may indicate an anterior side and a posterior side of the body of the subject. The localization circuitry may be configured to determine a right side of the body in CT images, based on the comparison result and the anatomical structure of the subject. The localization circuitry may be further configured to detect a first bottom portion of a right lung in the determined right side of the body in the CT images based on a distribution of a plurality of position values of pixels of a right lung in the CT images. The localization circuitry may detect a second bottom portion of the determined rib region in the determined right side of the body in the CT images based on a known shape of the rib region. The localization circuitry may be configured to localize a liver organ in the determined right side of the body in the CT images, from a reference of the detected first bottom portion of the right lung and the detected second bottom portion of the determined rib region.

In accordance with an embodiment, the CT images may be visualized from a set of views that comprises at least an axial view, a coronal view and a sagittal view of the portion of the body of the subject. The 3D representation of the anatomical portion of the body may be 3D volumetric data that comprises a plurality of voxels that are distributed in accordance with the plurality of internal organs and associated anatomical regions in the anatomical portion of the body in a 3D space. The localization circuitry may be further configured to segment a pair of lung regions from the CT images by application of a first thresholding operation on the CT images. The segmented pair of lung regions may comprise a left lung and the right lung of the subject. The pair of lung regions in the CT images post the application of the first thresholding operation may exhibit a plurality of intensity values that is less than a first threshold intensity value and located inside human body.

In accordance with an embodiment, the localization circuitry may be configured to detect a skeletal region of the body in the CT images by application of a second thresholding operation on the CT images. The skeletal region in CT images post the application of the second thresholding operation may exhibit a plurality of intensity values that is greater than a second threshold intensity value. The skeletal region may comprise the rib region, the spine region, and the other body portions different from the rib region and the spine region. The localization circuitry may be further configured to apply a mask on the other body portions different from the rib region and the spine region of the body on the CT images. The mask may be applied on the CT images such that a center of the mask coincides with a center of the bounding region that covers a maximum area of the detected skeletal region in the CT images. The localization circuitry may be configured to remove the masked other body portions different the rib region and the spine region for the determination of the rib region and the spine region of the body in the CT images.

In accordance with and embodiment, the localization circuitry may be further configured to identify a plane formed by a pair of centroids for a pair of lung regions in the CT images. The first region and the second region in the portion of the 3D representation may be determined based on the identified plane in the CT images. The first region of the portion of the 3D representation may correspond to a first half of the bifurcated two halves of the CT images. Additionally, the second region of the portion of the 3D representation may correspond to a second half of the bifurcated two halves of the CT images. The localization circuitry may be further configured to identify the first half as the anterior side and the second half as the posterior side of the body, based on the generated comparison result. In such case, in the generated comparison result, the first number of voxels in the portion of the 3D representation for the determined rib region and the spine region in the first region may be less than the second number of voxels in the portion of the 3D representation for the determined rib region and the spine region of the body.

In accordance with an embodiment, the localization circuitry may be further configured to compute the distribution of a plurality of position values of a surface of the region of the right lung with respect to a set of pixels in the region of the right lung along a specific axis. The localization circuitry may be configured to apply a gradient-based filtration on a bottom region associated with the position value by removal of a set of pixels from the bottom region that have a set of gradient vectors that point outwards with respect to the right lung.

In accordance with an embodiment, the localization circuitry may be configured to extract a liver bounding box that may include the liver organ. The liver bounding box may be extracted based on the detection of the first bottom portion of the right lung and the second bottom portion of the determined rib region in the CT images. The localization circuitry may be further configured to determine an area and positioning of the liver bounding box on the CT images by a reference to the first bottom portion of the right lung corresponds to a top edge of the liver bounding box of the liver organ and the second bottom portion of the rib region corresponds to a bottom edge of the liver bounding box of the liver organ. The localization circuitry may be configured to generate supplemental information that includes a set of markers assigned at a contour of the localized liver organ within the liver bounding box. The localization circuitry is further configured to control display of the localized liver organ on a display device such that the set of markers are visible at the contour of the localized liver organ, to assist in navigation of a surgical tool to reach to the localized liver organ within the body of the subject during a surgery.

In accordance with an embodiment of the disclosure, an assistive apparatus for internal organ localization in CT images is disclosed. The assistive apparatus, such as the assistive apparatus 102 (FIG. 1) may comprise a memory, such as the memory 204 (FIG. 2) and one or more circuits, such as the localization circuitry 202 (FIG. 2). The memory 204 may be configured to store a 3D representation of an anatomical portion of a body of a subject (such as a human subject 110 (FIG. 1)) and CT images (such as the CT images 302 (FIG. 3A)). The 3D representation and the CT images may comprise different representations of a plurality of internal organs and associated anatomical regions of the body. The localization circuitry 202 may be configured to determine a rib region (such as the rib region 318 in FIG. 3B) and a spine region (such as the spine region 320 in FIG. 3B) of the body in the CT images. The localization circuitry 202 may be further configured to calculate a first number of voxels within a first region of a portion of the 3D representation and a second number of voxels within a second region of the portion of the 3D representation. The first region and the second region may also bifurcate the CT images into two halves. The first number of voxels and the second number of voxels may be calculated from only the determined rib region 318 and the spine region 320 present in the first region and the second region. The localization circuitry 202 may be configured to generate a comparison result for the first number of voxels within the first region and the second number of voxels within the second region. The comparison result may indicate an anterior side and a posterior side of the body of the subject. The localization circuitry 202 may be configured to determine a right side of the body in CT images, based on the comparison result and an anatomical structure of the subject. The localization circuitry 202 may be further configured to detect a first bottom portion (such as the first bottom portion 344 in FIG. 3D) of a right lung in the determined right side of the body in the CT images. The first bottom portion 344 of the right lung may be detected based on a distribution of a plurality of position values of pixels in a right lung in the CT images. The localization circuitry 202 may be configured to detect a second bottom portion (such as the second bottom portion 352 in FIG. 3E) of the determined rib region 318 in the determined right side of the body in the CT images based on a known shape of the rib region. The localization circuitry 202 may be configured to localize a liver organ in the determined right side of the body in the CT images, from a reference of the detected first bottom portion of the right lung and the detected second bottom portion of the determined rib region.

Various embodiments of the disclosure may provide a non-transitory, computer-readable medium and/or storage medium, and/or a non-transitory machine readable medium and/or storage medium stored thereon, a set of instructions executable by a machine and/or a computer that comprises one or more circuits. The set of instructions may be executable by the machine and/or the computer to perform the steps that comprise storage of a 3D representation of an anatomical portion of a body of a subject, and CT images. The 3D representation and the CT images may comprise different representations of a plurality of internal organs and associated anatomical regions of the body. A rib region and a spine region of the body in the CT images may be determined. A first number of voxels within a first region of a portion of the 3D representation and a second number of voxels within a second region of the portion of the 3D representation may be calculated. The first region and the second region may bifurcate the CT images into two halves. The first number of voxels and the second number of voxels may be calculated from only the determined rib region and the spine region present in the first region and the second region. A comparison result for the first number of voxels within the first region and the second number of voxels within the second region may be generated. The comparison result may indicate an anterior side and a posterior side of the body of the subject. A right side of the body in the CT images may be determined, based on the comparison result and an anatomical structure of the subject. A first bottom portion of a right lung in the determined right side of the body in the CT images may be detected, based on a distribution of a plurality of position values of pixels along "Z" axis of a 3D coordinate space in a right lung in the CT images. A second bottom portion of the determined rib region in the determined right side of the body in the CT images may be detected, based on a known shape of the rib region. A liver organ may be localized in the determined right side of the body in the CT images, from a reference of the detected first bottom portion of the right lung and the detected second bottom portion of the determined rib region.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. An assistive apparatus, comprising:
   a memory configured to store a three dimensional (3D) representation of an anatomical portion of a body of a subject, and computed tomography (CT) images, wherein the 3D representation and the CT images comprises different representations of a plurality of internal organs and associated anatomical regions of the body; and
   localization circuitry configured to:
      determine a rib region and a spine region of the body in the CT images;
      calculate a first number of voxels within a first region of a portion of the 3D representation and a second number of voxels within a second region of the portion of the 3D representation, wherein the first region and the second region bifurcates the CT images into two halves, and wherein the first number of voxels and the second number of voxels are calculated from only the determined rib region and the spine region present in the first region and the second region;
      generate a comparison result for the first number of voxels within the first region and the second number of voxels within the second region, wherein the comparison result indicates an anterior side and a posterior side of the body;
      determine a right side of the body in the CT images, based on the comparison result and an anatomical structure of the subject;
      detect a first bottom portion of a right lung in the determined right side of the body in the CT images based on a distribution of a plurality of position values of pixels of a right lung in the CT images;
      detect a second bottom portion of the determined rib region in the determined right side of the body in the CT images based on a known shape of the rib region; and
      localize a liver organ in the determined right side of the body in the CT images, from a reference of the detected first bottom portion of the right lung and the detected second bottom portion of the determined rib region.

2. The assistive apparatus according to claim 1, wherein the localization circuitry is configured to utilize the CT images to generate a set of views that comprises at least an axial view, a coronal view and a sagittal view of the portion of the body of the subject.

3. The assistive apparatus according to claim 1, wherein the 3D representation of the anatomical portion of the body is 3D volumetric data that comprises a plurality of voxels that are distributed in accordance with the plurality of internal organs and associated anatomical regions in the anatomical portion of the body in a 3D space.

4. The assistive apparatus according to claim 1, wherein the localization circuitry is further configured to segment a pair of lung regions from the CT images by a first thresholding operation on the CT images, wherein the pair of lung regions comprises a left lung and the right lung.

5. The assistive apparatus according to claim 4, wherein the pair of lung regions in the CT images post the first thresholding operation exhibit a plurality of intensity values that is less than a first threshold intensity value.

6. The assistive apparatus according to claim 1, wherein the localization circuitry is further configured to detect a skeletal region of the body in the CT images by a second thresholding operation on the CT images.

7. The assistive apparatus according to claim 6, wherein the skeletal region in the CT images post the second thresholding operation exhibit a plurality of intensity values that is greater than a second threshold intensity value.

8. The assistive apparatus according to claim 7, wherein the skeletal region comprises the rib region, the spine region, and body portions different from the rib region and the spine region.

9. The assistive apparatus according to claim 8, wherein the localization circuitry is further configured to apply a mask on the body portions different from the rib region and the spine region of the body on the CT images, wherein the mask is applied on the CT images such that a center of the mask coincides with a center of a bounding region that covers a maximum area of the detected skeletal region in the CT images.

10. The assistive apparatus according to claim 9, wherein the localization circuitry is further configured to remove the masked body portions different the rib region and the spine region for the determination of the rib region and the spine region of the body in the CT images.

11. The assistive apparatus according to claim 1, wherein the localization circuitry is further configured to identify a plane formed by a pair of centroids for a pair of lung regions in the CT images, wherein the first region and the second region in the portion of the 3D representation are determined based on the identified plane in the CT images.

12. The assistive apparatus according to claim 1, wherein the first region of the portion of the 3D representation corresponds to a first half of the bifurcated two halves of the CT images and the second region of the portion of the 3D representation corresponds to a second half of the bifurcated two halves of the CT images.

13. The assistive apparatus according to claim 12, wherein the localization circuitry is further configured to identify the first half as the anterior side and the second half as the posterior side of the body, based on the generated comparison result, when in the generated comparison result the first number of voxels in the portion of the 3D representation for the determined rib region and the spine region in the first region is less than the second number of voxels in the portion of the 3D representation for the determined rib region and the spine region of the body.

14. The assistive apparatus according to claim 1, wherein the localization circuitry is further configured to compute the distribution of a plurality of position values on a surface of the right lung for a plurality of pixels of the right lung along a specific axis in the CT images.

15. The assistive apparatus according to claim 1, wherein the localization circuitry is further configured to extract a liver bounding box that includes the liver organ, based on the detection of the first bottom portion of the right lung and the second bottom portion of the determined rib region in the CT images.

16. The assistive apparatus according to claim 15, wherein the localization circuitry is further configured to determine an area and positioning of the liver bounding box on the CT images by a reference to the first bottom portion of the right lung corresponds to a top edge of the liver bounding box of the liver organ and the second bottom portion of the rib region corresponds to a bottom edge of the liver bounding box of the liver organ.

17. The assistive apparatus according to claim 16, wherein the localization circuitry is further configured to generate supplemental information that includes a set of markers assigned at a contour of the localized liver organ within the liver bounding box, wherein the localization circuitry is further configured to control display of the localized liver organ on a display device such that the set of markers are visible at the contour of the localized liver organ, to assist in navigation of a surgical tool to reach to the localized liver organ within the body of the subject during a surgery.

18. A method, comprising:
 in an assistive apparatus that comprises a memory and localization circuitry:
  storing, by the memory, a three dimensional (3D) representation of an anatomical portion of a body of a subject, and computed tomography (CT) images, wherein the 3D representation and the CT images comprises different representations of a plurality of internal organs and associated anatomical regions of the body;
  determining, by the localization circuitry, a rib region and a spine region of the body in the CT images;
  calculating, by the localization circuitry, a first number of voxels within a first region of a portion of the 3D representation and a second number of voxels within a second region of the portion of the 3D representation, wherein the first region and the second region bifurcates the CT images into two halves, and wherein the first number of voxels and the second number of voxels are calculated from only the determined rib region and the spine region present in the first region and the second region;
  generating, by the localization circuitry, a comparison result for the first number of voxels within the first region and the second number of voxels within the second region, wherein the comparison result indicates an anterior side and a posterior side of the body;
  determining, by the localization circuitry, a right side of the body in the CT images, based on the comparison result and the anatomical structure of the subject;
  detecting, by the localization circuitry, a first bottom portion of a right lung in the determined right side of the body in the CT images based on a distribution of a plurality of position values of pixels of the right lung in the CT images;
  detecting, by the localization circuitry, a second bottom portion of the determined rib region in the determined right side of the body in the CT images based on a known shape of the rib region; and
  localizing, by the localization circuitry, a liver organ in the determined right side of the body in the CT images, from a reference of the detected first bottom portion of the right lung and the detected second bottom portion of the determined rib region.

19. The method according to claim 18, further comprising utilizing, by the localization circuitry, the CT images to generate a set of views that comprises at least an axial view, a coronal view and a sagittal view of the portion of the body of the subject.

20. The method according to claim 18, wherein the 3D representation of the anatomical portion of the body is 3D volumetric data that comprises a plurality of voxels that are distributed in accordance with the plurality of internal organs and associated anatomical regions in the anatomical portion of the body in a 3D space.

* * * * *